United States Patent
Tan

(10) Patent No.: US 10,796,441 B2
(45) Date of Patent: Oct. 6, 2020

(54) APPARATUS AND METHOD FOR IMAGE-DISTANCE TRANSFORMATION USING BI-DIRECTIONAL SCANS

(71) Applicant: Delta Electronics, Inc., Taoyuan (TW)

(72) Inventor: Sze-Yeong Tan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 65 days.

(21) Appl. No.: 16/164,473

(22) Filed: Oct. 18, 2018

(65) Prior Publication Data

US 2019/0347812 A1 Nov. 14, 2019

(30) Foreign Application Priority Data

May 11, 2018 (CN) .......................... 2018 1 0449838

(51) Int. Cl.
 *G06T 7/50* (2017.01)
 *G06K 9/62* (2006.01)
 *G06T 7/11* (2017.01)
(52) U.S. Cl.
 CPC .............. *G06T 7/50* (2017.01); *G06K 9/6202* (2013.01); *G06K 9/6215* (2013.01); *G06T 7/11* (2017.01); *G06T 2207/20041* (2013.01)

(58) Field of Classification Search
CPC ...... G06K 9/6202; G06K 9/6215; G06T 7/50; G06T 7/11
See application file for complete search history.

(56) References Cited

U.S. PATENT DOCUMENTS

| | | | |
|---|---|---|---|
| 2008/0143766 A1* | 6/2008 | Hawkins | B41J 2/03 347/11 |
| 2014/0140472 A1* | 5/2014 | Hemmendorff | A61B 6/025 378/19 |
| 2014/0198896 A1* | 7/2014 | Hemmendorff | A61B 6/502 378/37 |
| 2019/0172231 A1* | 6/2019 | Polster | G06T 11/005 |

* cited by examiner

*Primary Examiner* — John J Lee
(74) *Attorney, Agent, or Firm* — Muncy, Geissler, Olds & Lowe, P.C.

(57) ABSTRACT

A method of image-distance transformation using bi-directional scans is provided. The method includes the steps of: performing a first scan on each pixel of an input image using a first mask in a first order to generate an intermediate image; and performing a second scan on each pixel of the intermediate image using a second mask in a second order to obtain distance information of each pixel in the input image. A first current pixel in the input image that is not compared with prior pixels in the first order and in a first current segment is used in the first comparison process in the first scan, and a second current pixel that is compared with prior pixels in the second order and in a second segment is used in the second comparison process in the second scan.

10 Claims, 13 Drawing Sheets

Performing a first scan on each pixel of an input image using a first mask in a first order to generate an intermediate image, wherein the first scan includes a first comparison process and a first updating process — S610

Performing a second scan on each pixel of the intermediate image using a second mask in a second order to obtain distance information of each pixel in the input image, wherein the second scan includes a second comparison process and a second updating process — S620

| q1 | q2 | q3 |
|----|----|----|
| q0 | p  | q4 |
| q7 | q6 | q5 |

FIG. 2A

| d1 | d0 | d1 |
|----|----|----|
| d0 | 0  |    |

FIG. 2B

|    | 0  | d0 |
|----|----|----|
| d1 | d0 | d1 |

FIG. 2C

|   |   |   |
|---|---|---|
| 4 | 3 | 4 |
| 3 | 0 | 3 |
| 4 | 3 | 4 |

FIG. 3A

| 4 | 3 | 4 |
|---|---|---|
| 3 | 0 |   |

FIG. 3B

|   | 0 | 3 |
|---|---|---|
| 4 | 3 | 4 |

FIG. 3C

| V1+4 | V2+3 | V3+4 |
|------|------|------|
| V0+3 | P    |      |

FIG. 3D

|      | P    | V3+3 |
|------|------|------|
| V0+4 | V1+3 | V2+4 |

| Type of Mask | Forward-scan Mask | Backward-scan Mask |
|---|---|---|
| 3×3 Chamfer Mask | 4 3 4<br>③ 0 -<br>- - - | - - -<br>- 0 ③<br>4 3 4 |
| City-block Mask | - 1 -<br>① 0 -<br>- - - | - - -<br>- 0 ①<br>- 1 - |
| Chessboard Mask | 1 1 1<br>① 0 -<br>- - - | - - -<br>- 0 ①<br>1 1 1 |
| 5×5 Chamfer Mask | - 11 - 11 -<br>11 7 5 7 11<br>- ⑤ 0 - -<br>- - - - -<br>- - - - - | - - - - -<br>- - - - -<br>- - 0 ⑤ -<br>11 7 5 7 11<br>- 11 - 11 - |
| 7×7 Chamfer Mask | - 43 38 - 38 43 -<br>43 - 27 - 27 - 43<br>38 27 17 12 17 27 38<br>- - ⑫ 0 - - -<br>- - - - - - -<br>- - - - - - -<br>- - - - - - - | - - - - - - -<br>- - - - - - -<br>- - - - - - -<br>- - - 0 ⑫ - -<br>38 27 17 12 17 27 38<br>43 - 27 - 27 - 43<br>- 43 38 - 38 43 - |

FIG. 5

FIG. 7A

APPARATUS AND METHOD FOR IMAGE-DISTANCE TRANSFORMATION USING BI-DIRECTIONAL SCANS

CROSS REFERENCE TO RELATED APPLICATIONS

This application claims priority of China Patent Application No. 201810449838.7, filed on May 11, 2018, the entirety of which is incorporated by reference herein.

BACKGROUND OF THE INVENTION

Field of the Invention

The invention relates to video conferencing, and, in particular, to an apparatus and a method for image-distance transformation using bi-directional scans.

Description of the Related Art

In a binary image, pixels can be classified into two categories: background pixels (e.g., with a pixel value of 0) and target pixels (e.g., with a pixel value of 1). Distance transformation is a process that converts the pixel values of 0 or 1 of each pixel in the binary image to a distance between each pixel and its nearest target pixel, and the converted distance value of a target pixel is 0. After distance transformation, information such as image edges and geometries can be displayed on the transformed image that can be further used on applications such as object matching, image thinning, and route planning.

Currently, algorithms for distance transformation can be classified into approximate Euclidean-distance-transform algorithms and exact Euclidean-distance-transform algorithms. Generally, the approximate Euclidean-distance transform can be implemented using two masks such as 3×3, 5×5, or 7×7 masks, where one of the masks is used in the forward scan and another one of the masks is used in the backward scan. The coefficients in each mask are simplified into integers. That is, the Euclidean distance between the foreground pixel and the background pixel can be calculated approximately. There are errors exiting in such kind of approximate algorithms such as the city-block distance or Manhattan distance algorithm. However, the approximate algorithms can be easily implemented and have faster calculation speeds, and thus can be applied to image processing that does not require high precision, such as surveillance images or medical images.

Exact Euclidean-distance-transform algorithms have to calculate the precise Euclidean distance between the foreground pixel and the background pixel, resulting in high computation complexity and longer calculation time. Thus, the exact Euclidean-distance-transform algorithms are not applied to common applications.

With regard to calculation of approximate Euclidean distance transform, due to the design of the masks, the calculation of the current pixel generally requires the calculation result of the previous pixel, resulting in data dependency. In addition, the instructions that are obtained by compiling the program codes of approximate Euclidean distance transform may have data dependency. Accordingly, the processor has to wait for the calculation result of the previous pixels upon execution of the instructions, resulting in poor performance.

Accordingly, there is demand for an apparatus and a method for image-distance transformation to solve the aforementioned problem.

BRIEF SUMMARY OF THE INVENTION

A detailed description is given in the following embodiments with reference to the accompanying drawings.

In an exemplary embodiment, a method of image-distance transformation using bi-directional scans is provided. The method includes the steps of: performing a first scan on each pixel of an input image using a first mask in a first order to generate an intermediate image, wherein the first scan includes a first comparison process and a first updating process; and performing a second scan on each pixel of the intermediate image using a second mask in a second order to obtain distance information of each pixel in the input image, wherein the second scan includes a second comparison process and a second updating process. A first current pixel of the input image is not compared with pixels in the input image prior to the first current pixel in the first order and in a first current segment on which the first current pixel is located in the first comparison process. A second current pixel of the intermediate image is not compared with pixels in the intermediate image prior to the second current pixel in the second order and in a second current segment on which the second current pixel is located in the second comparison process.

In another exemplary embodiment, an apparatus for image-distance transformation is provided. The apparatus includes: a memory unit and a processor. The memory unit is configured to store an image-distance-transformation program. The processor is configured to read the image-distance-transformation program from the memory unit for execution to perform the following steps: performing a first scan on each pixel of an input image using a first mask in a first order to generate an intermediate image, wherein the first scan includes a first comparison process and a first updating process; and performing a second scan on each pixel of the intermediate image using a second mask in a second order to obtain distance information of each pixel in the input image, wherein the second scan includes a second comparison process and a second updating process; wherein a first current pixel of the input image is not compared with pixels in the input image prior to the first current pixel in the first order and in a first current segment on which the first current pixel is located in the first comparison process; wherein a second current pixel of the intermediate image is not compared with pixels in the intermediate image prior to the second current pixel in the second order and in a second current segment on which the second current pixel is located in the second comparison process.

BRIEF DESCRIPTION OF THE DRAWINGS

The invention can be more fully understood by reading the subsequent detailed description and examples with references made to the accompanying drawings, wherein:

FIG. 2A is a diagram of bi-directional scans in a 3×3 region in accordance with an embodiment of the invention;

FIG. 2B is a diagram of a forward-scan mask in accordance with an embodiment of the invention;

FIG. 2C is a diagram of a backward-scan mask in accordance with an embodiment of the invention;

FIG. 3A is a diagram of a scan mask in accordance with an embodiment of the invention;

FIG. 3B is a diagram of a forward-scan mask in accordance with an embodiment of FIG. 3A;

FIG. 3C is a diagram of a backward-scan mask in accordance with an embodiment of FIG. 3A;

FIG. 3D is a diagram of pixels in the forward-scan mask in accordance with an embodiment of the invention;

FIG. 3E is a diagram of pixels in the backward-scan mask in accordance with an embodiment of the invention;

FIGS. 4A~4C are diagrams of the first comparison process in the forward-scan in accordance with an embodiment of the invention;

FIG. 5 is a diagram of different scan masks in accordance with an embodiment of the invention;

FIGS. 7A and 7B are diagrams of image distance transformation using different orders in accordance with an embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
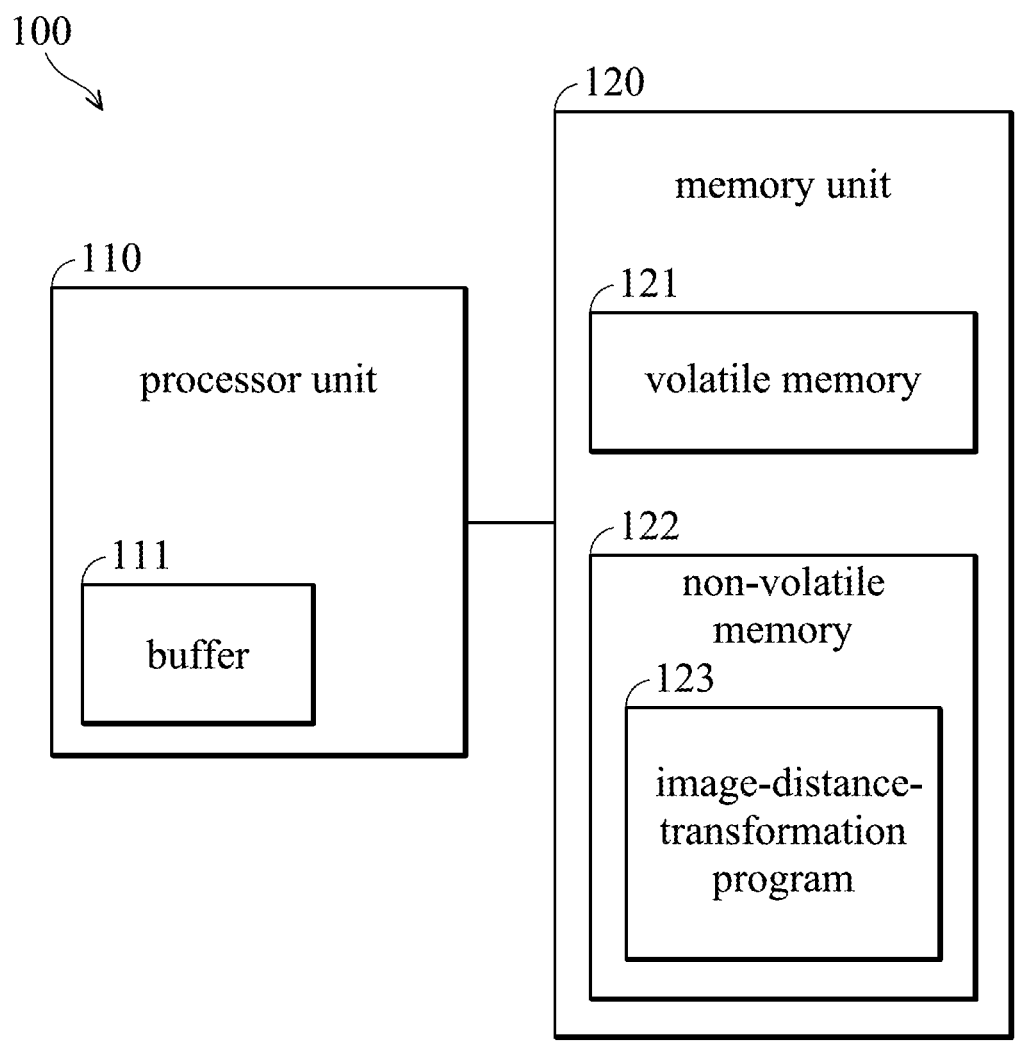
FIG. 1 is a block diagram of an image-distance-transformation apparatus in accordance with an embodiment of the invention.

FIG. 1 is a block diagram of an apparatus for image-distance transformation in accordance with an embodiment of the invention. As illustrated in FIG. 1, the apparatus 100 includes a processing unit 110 and a memory unit 120. The processing unit 110 may be a general-purpose processor, a digital signal processor (DSP), or an image signal processor, but the invention is not limited thereto. The processing unit 110 includes a buffer 111 configured to store intermediate data during execution of the method for image-distance transformation.

The memory unit 120 includes a volatile memory 121 and a non-volatile memory 122. The volatile memory 121 may be a random access memory such as a static random access memory (SRAM) or a dynamic random access memory (DRAM), but the invention is not limited thereto. The non-volatile memory 122 may be a hard-disk drive, a solid-state disk (SSD), a flash memory, or a read-only memory (ROM), but the invention is not limited thereto.

The non-volatile memory 122 may store an image-distance-transformation program 123. The processing unit 110 may load the image-distance-transformation program 123 from the non-volatile memory 122 to the volatile memory 121 for execution, wherein the image-distance-transformation program 123 includes program codes of a method for image-distance transformation.

FIG. 2A is a diagram of bi-directional scans in a 3×3 region in accordance with an embodiment of the invention. As illustrated in FIG. 2A, in the 3×3 region, the prediction pixel p has eight neighboring pixels q0-q7 that can be classified into a first set N1={q0, q1, q2, q3} and a second set N2={q4, q5, q6, q7}. Abbreviations of symbols that are used in the distance-transformation algorithm using bi-directional scans are described in the following sections.

f denotes the two-dimensional map recording the Euclidean distances. F denotes the set of foreground (or object) pixels. F' denotes the set of background pixels.

The pixel p has a relative-coordinate vector R(p)=(Rx, Ry) which records the horizontal pixel distance and the vertical pixel distance between pixel p and its closest background pixel, and the initial value of R(p) is (0, 0). It should be noted that Rx(p) and Ry(p) denote the horizontal pixel distance and vertical pixel distance, respectively.

h(p, q) denote the difference between squared Euclidean distances of pixels p and q, where pixel q belongs to the union of sets N1 and N2. That is, q∈{q0, q1, q2, q3, q4, q5, q6, q7}.

G(p, q) denote the difference between the relative coordinates of pixels p and q, where pixel q belongs to the union of sets N1 and N2. That is, q∈(q0, q1, q2, q3, q4, q5, q6, q7).

h(p, q) and G(p, q) can be computed using the following equations:

$$h(p, q) = \begin{cases} 2R_x(q) + 1 & \text{if } q \in \{q_0, q_4\}, \\ 2R_y(q) + 1 & \text{if } q \in \{q_2, q_6\}, \\ 2(R_x(q) + R_y(q) + 1) & \text{if } q \in \{q_1, q_3, q_5, q_7\}, \end{cases}$$

$$G(p, q) = \begin{cases} (1, 0) & \text{if } q \in \{q_0, q_4\}, \\ (0, 1) & \text{if } q \in \{q_2, q_6\}, \\ (1, 1) & \text{if } q \in \{q_1, q_3, q_5, q_7\}. \end{cases}$$

During the procedure of distance transformation using bi-directional scans, the forward scan is first performed on the input binary image to generate an intermediate image, and then the backward scan is performed on the intermediate image to obtain the output-distance image.

Specifically, the forward scan indicates applying a forward-scan mask on the binary image in an order of the raster scan to process pixels of the binary image from left to right and from top to bottom to generate the intermediate image. The backward scan indicates applying a backward-scan mask on the intermediate image in an order of the inverse raster scan to process pixels of the intermediate image from right to left and from bottom to top to generate the output-distance image.

In an embodiment, the pseudo codes of the procedure of bi-directional distance transformation can be expressed in the following sections:

Forward Scan:

```
if p ∈ F {
   f(p) = ∞;
   for q = q1 to q4
      f(p) = min(f(p),f(q) + h(p,q));
   if exist q that containing minimum (f(q) + h(p,q)) and
   (f(q) + h(p,q) < f(p))
      R(p) = R(q) + G(p,q);
}
```

Backward Scan:

```
if p ∈ F {
  for q = q_5 to q_8
    f(p) = min(f(p),f(q) + h(p,q));
    if exist q that containing minimum (f(q) + h(p,q)) and
    (f(q) + h(p,q) < f(p))
      R(p) = R(q) + G(p,q);
      E(p) = √f(p);
}
```

However, the calculation of the minimum value in the above-mentioned bi-directional scans may have the program of data dependency. FIG. 2B and FIG. 2C depict the forward-scan mask and the backward-scan mask, respectively. Specifically, as illustrated in FIG. 2B, the distance between the current pixel P and its horizontal or vertical neighboring pixel (e.g., q0 and q2) in the forward-scan mask is d0, and the distance between the current pixel P and pixels q1 and q3 is d1. Similarly, the distance between the current pixel P and its horizontal or vertical neighboring pixel (e.g., q4 and q6) in the backward-scan mask is d0, and the distance between the current pixel P and pixels q5 and q7 is d1. In an embodiment, d0 is equal to 1 and d1 is equal to 2.

Figure 2D:
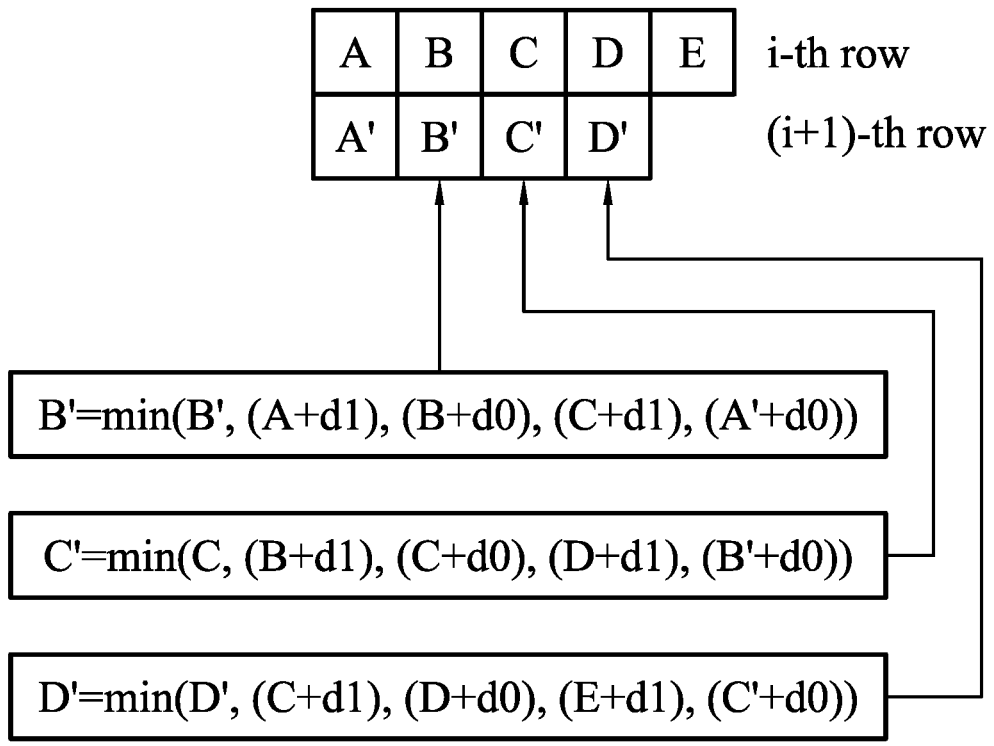
FIG. 2D is a diagram of a portion of the input image in accordance with an embodiment of the invention.

During the process of applying the forward-scan mask on the i-th row and (i+1)-th row of the input image in FIG. 2D, it can be appreciated that the distance of pixel A' is used in the calculation of the distance of pixel B'; the distance of pixel B' is used in the calculation of the distance of pixel C'; the distance of pixel C' is used in the calculation of the distance of D'. Accordingly, the above-mentioned calculations have data dependency.

In the distance-transformation process of the present invention, the procedure of the forward scan (e.g., first scan) may include a first comparison process and a first updating process, and the backward scan (e.g., second scan) may include a second comparison process and a second updating process, thereby eliminating the problem of data dependency.

For example, in the beginning of the first comparison process in the forward scan, if the target pixel is a foreground pixel, the value of f(p) can be set to infinite (INF). In practical implementations, the value of INF can be an extremely large value, such as the upper-limit value of unsigned integers.

Then, the processing unit 110 may execute the first program code:

Step (1): performing iterations on q={q1, q2, q3} to calculate the minimum value min (f(q), f(p)+h(p,q)), and assigning the calculation result to f(p). It should be noted that the aforementioned calculation does not consider the condition of q=q0.

Step (2): if there exists q including min(f(q), f(p)+h(p,q)) and (f(p)+h(p,q))<f(p), updating R(p) to R(q)+G(p,q), and updating the value of index x of the target pixel in the buffer to f(p).

During the first updating process of the forward-scan, the processing unit 110 may execute the second program code:

Step (1): if the value of index x of the target pixel in the buffer is not equal to INF, comparing the value in the buffer with f(q0)+f(p, q0).

Step (2) if the value in the buffer is smaller than f(q0)+f(p, q0), setting the target pixel to the value in the buffer. If the value in the buffer is larger than or equal to f(q0)+f(p, q0), setting the target pixel to f(q0)+f(p, q0) and updating R(p) to R(q0)+G(p, q0).

It should be noted that the data dependency is eliminated in the first program code, but it still exists in the second program code. Since the calculations in the second program code are relatively simple and are performed on pixels row by row, the data dependency of the loops in the second program code is little, and the associated calculations of the loops in the second program code may only in a small portion of the overall calculations.

Figures 3A, 3B, 3C:
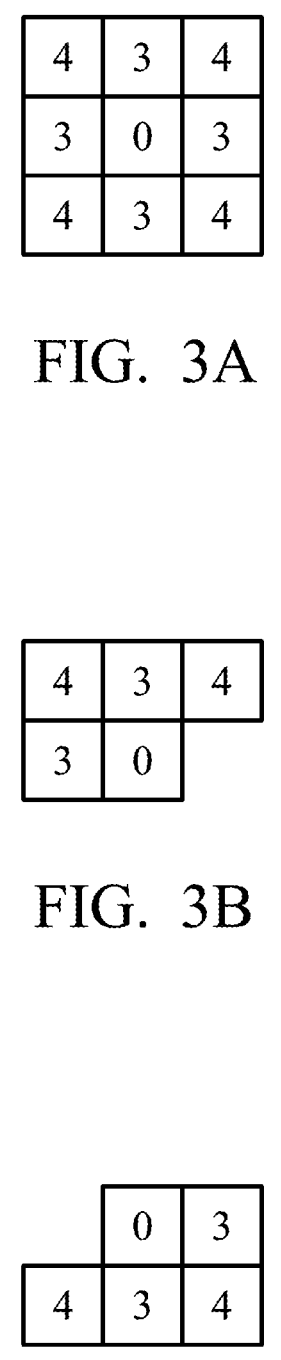

FIG. 3A is a diagram of a scan mask in accordance with an embodiment of the invention. FIG. 3B is a diagram of a forward-scan mask in accordance with an embodiment of FIG. 3A. FIG. 3C is a diagram of a backward-scan mask in accordance with an embodiment of FIG. 3A.

In an embodiment, a 3×3 chamfer mask is used to calculate the distance of the object in the image, as illustrated in FIG. 3A. When bi-directional scans are used to calculate the distance of the object in the image, a forward-scan mask and a backward-scan mask are used, as illustrated in FIG. 3B and FIG. 3C, respectively. It should be noted that the pixel value of the background pixels can be set to infinite that can be set to an extremely large value in practical implementations. For example, the distance of the foreground pixels can be set to 0 and the distance of the background pixels can be set to the upper-limit value of unsigned integers.

Figures 3D, 3E:
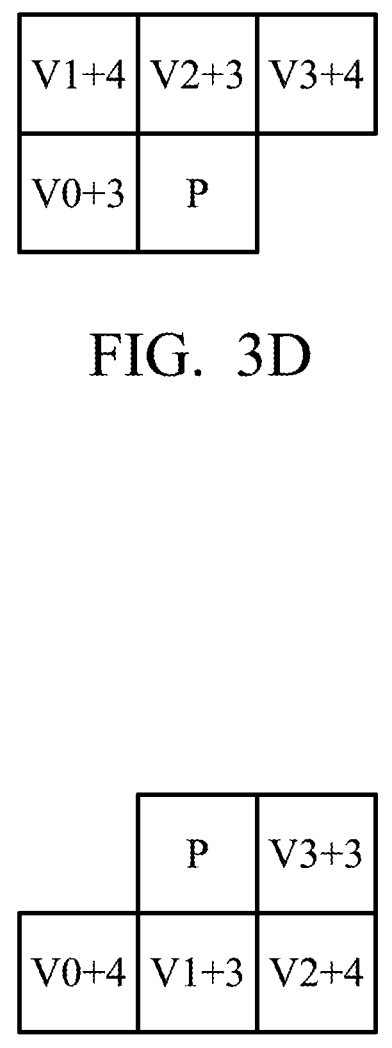

FIG. 3D is a diagram of pixels in the forward-scan mask in accordance with an embodiment of the invention. FIG. 3E is a diagram of pixels in the backward-scan mask in accordance with an embodiment of the invention. If the forward-scan mask in FIG. 3B is used, pixel P is the pixel to be calculated, and pixels V0~V3 are neighboring pixels of pixel P in the forward-scan mask. If the conventional forward-scan calculation is applied, the value of pixel P is calculated as P=min(P+0, V0+3, V1+4, V2+3, V3+4), as illustrated in FIG. 3D, and the left neighboring pixel of pixel P is used in the conventional forward-scan calculation, resulting in the problem of data dependency.

Similarly, if the backward-scan mask in FIG. 3C is used, pixel P is the pixel to be calculated, and pixels V0~V3 are neighboring pixels of pixel P in the backward-scan mask. If the conventional forward-scan calculation is applied, the value of pixel P is calculated as P=min(P+0, V0+4, V+3, V2+4, V3+3), as illustrated in FIG. 3E, and the right neighboring pixel of pixel P is used in the conventional backward-scan calculation, resulting in the same problem of data dependency.

In an embodiment, the bi-directional distance transformation in the present invention includes the forward-scan and backward-scan, and the forward-scan includes a first comparison process and a first updating process, and the backward-scan includes a second comparison process and a second updating process, thereby eliminating the problem of data dependency.

Figures 4A, 4B, 4C:
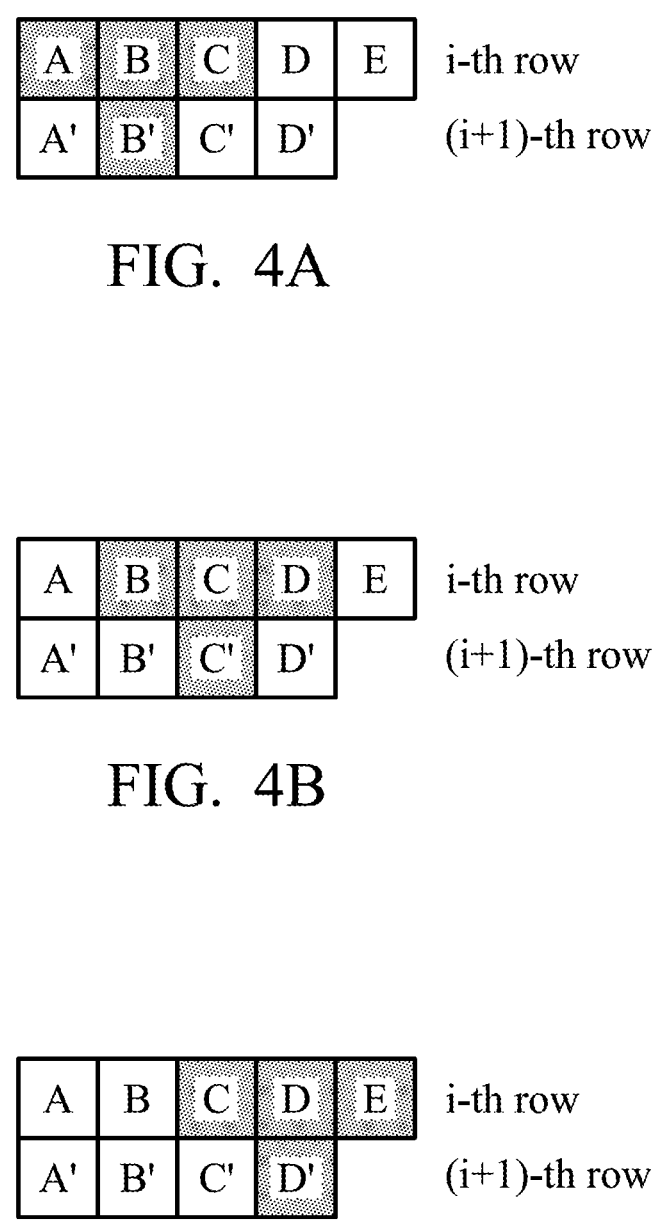

FIGS. 4A~4C are diagrams of the first comparison process in the forward-scan in accordance with an embodiment of the invention. In FIG. 4A, if the current pixel of the current row (e.g., the (i+1)-th row) of the input image is B' (e.g., the first current pixel), the current pixel B' is updated to min((B'+0),(A+4),(B+3),(C+4)) in the first comparison process of the forward-scan, such as using pixels (e.g., upper-left pixel A, upper pixel B, and upper-right pixel C) in the previous row (e.g., the i-th row) and the current pixel B' in the calculation of the forward-scan.

In FIG. 4B, if the current pixel of the current row (e.g., the (i+1)-th row) of the input image is C', the current pixel C' is updated to min((C'+0),(B+4),(C+3),(D+4)) in the first comparison process of the forward-scan, such as using pixels (e.g., upper-left pixel B, upper pixel C, and upper-right pixel D) in the previous row (e.g., the i-th row) and the current pixel C' in the calculation of the forward-scan.

In FIG. 4C, if the current pixel of the current row (e.g., the (i+1)-th row) of the input image is D', the current pixel D' is updated to min((D'+0),(C+4),(D+3),(E+4)) in the first comparison process of the forward-scan, such as using pixels (e.g., upper-left pixel C, upper pixel D, and upper-right pixel E) in the previous row (e.g., the i-th row) and the current pixel D' in the calculation of the forward-scan.

In the first comparison process of the forward-scan, similar procedures illustrated in FIGS. 4A~4C are performed to update the current pixel. After completing the first comparison process of the forward-scan for the current row (e.g., the (i+1)-th row) of the input image, a forward-scan intermediate row image (e.g., a first intermediate segment image) is generated. It should be noted that, in the first comparison process, the left neighboring pixel of the current pixel is not used. For example, while performing the first comparison process of the current pixel B', the left neighboring pixel A' of the current pixel B' is not used, and thus it will not cause the problem of data dependency.

Figure 4D:
FIGS. 4D~4F are diagrams of the first updating process in the forward-scan in accordance with an embodiment of the invention.
Figure 4E:
Figure 4F:

FIGS. 4D~4F are diagrams of the first updating process in the forward-scan in accordance with an embodiment of the invention. After completing the first comparison process of the forward-scan for the current row (e.g., the (i+1)-th row) of the input image, a forward-scan intermediate row image (e.g., a first intermediate segment image) is generated. Then, the first updating process in the forward-scan is performed on the forward-scan intermediate row image. As illustrated in FIG. 4D, if the current pixel of the forward-scan intermediate row image is B', pixel B' is compared with its left neighboring pixel A' plus a distance in the first updating process, and the minimum value is used to update pixel B'. For example, the aforementioned calculation can be expressed using the following equation: B'=min(B',A'+3).

As illustrated in FIG. 4E, if the current pixel of the forward-scan intermediate row image is C', pixel C' is compared with its left neighboring pixel B' plus a distance in the first updating process, and the minimum value is used to update pixel C'. For example, the aforementioned calculation can be expressed using the following equation: C'=min(C',B'+3).

As illustrated in FIG. 4F, if the current pixel of the forward-scan intermediate row image is D', pixel D' is compared with its left neighboring pixel C' plus a distance in the first updating process, and the minimum value is used to update pixel D'. For example, the aforementioned calculation can be expressed using the following equation: D'=min(D',C'+3). After completing the first updating process in the forward-scan for the current row of forward-scan intermediate row image, the forward-scan of the current row is completed and an intermediate row image is generated to update the pixels in the current row of the input image. Similarly, the first comparison process and the first updating process can be sequentially performed on pixels in each row of the input image to generate an intermediate image.

Figure 4G:
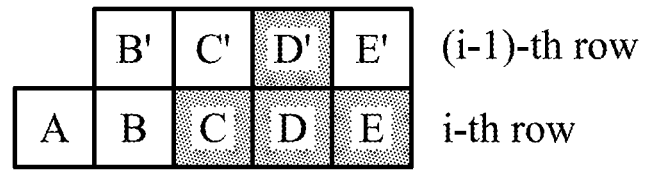
FIGS. 4G~4I are diagrams of the second comparison process in the backward-scan in accordance with an embodiment of the invention.
Figure 4H:
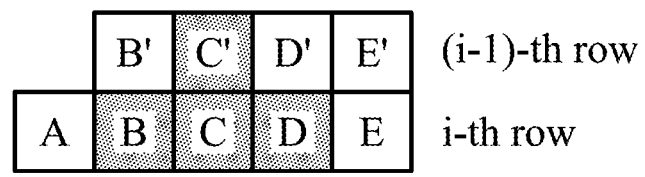
Figure 4I:
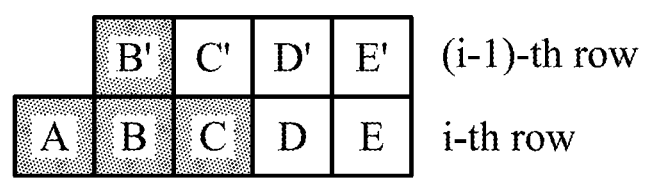

FIGS. 4G~4I are diagrams of the second comparison process in the backward-scan in accordance with an embodiment of the invention. After completing the first comparison process and the first updating process for pixels in each row of the input image, an intermediate image is generated. In an embodiment, the backward scan includes the second comparison process and the second updating process. The scan order of the backward scan (including the second comparison process and the second updating process) is an inverse raster scan order to process pixels of the intermediate image from bottom to up and from right to left.

Then, the second comparison process in the backward scan is performed on the current row (e.g., the (i−1)-th row) of the intermediate image obtained from the forward-scan. As illustrated in FIG. 4G, if the current pixel of the current row in the intermediate image is D', the current pixel D' is updated to min((D'+0),(C+4),(D+3).(E+4)) in the second comparison process in the backward scan, such as using the pixels (e.g., lower-left pixel C, lower pixel D, and lower-right pixel E) in the next row (e.g., the i-th row) and the current pixel D' in the backward-scan mask shown in FIG. 3C for calculation.

As illustrated in FIG. 4H, if the current pixel of the current row in the intermediate image is C', the current pixel C' is updated to min((C'+0),(B+4),(C+3),(D+4)) in the second comparison process in the backward scan, such as using the pixels (e.g., lower-left pixel B, lower pixel C, and lower-right pixel D) in the next row (e.g., the i-th row) and the current pixel C' in the backward-scan mask shown in FIG. 3C for calculation.

As illustrated in FIG. 4I, if the current pixel of the current row in the intermediate image is B', the current pixel B' is updated to min((B'+0),(A+4),(B+3),(C+4)) in the second comparison process in the backward scan, such as using the pixels (e.g., lower-left pixel A, lower pixel B, and lower-right pixel C) in the next row (e.g., the i-th row) and the current pixel B' in the backward-scan mask shown in FIG. 3C for calculation.

In the second comparison process of the backward-scan, similar procedures illustrated in FIGS. 4G~4I are performed to update the current pixel. After completing the second comparison process of the backward-scan for the current row (e.g., the (i−1)-th row) of the intermediate image, a backward-scan intermediate row image (e.g., a second intermediate segment image) is generated. It should be noted that, in the second comparison process, the right neighboring pixel of the current pixel is not used. For example, while performing the second comparison process of the current pixel D', the right neighboring pixel E' of the current pixel D' is not used, and thus it will not cause the problem of data dependency.

Figure 4J:
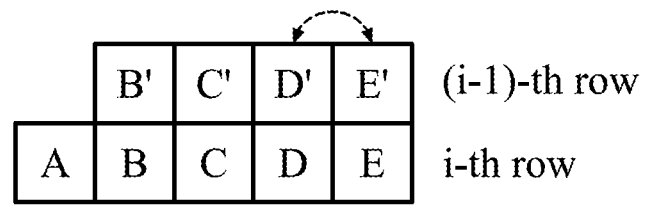
FIG. 4J~4L are diagrams of the second updating process in the backward scan in accordance with an embodiment of the invention.
Figure 4K:
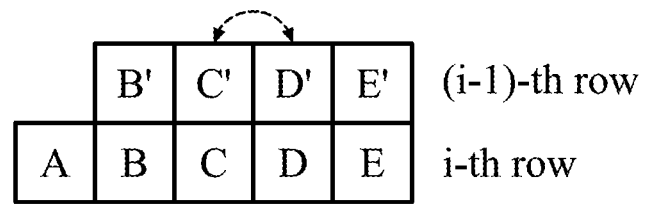
Figure 4L:
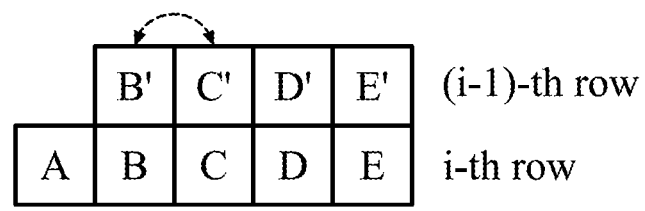

FIG. 4J~4L are diagrams of the second updating process in the backward scan in accordance with an embodiment of the invention. After completing the second comparison process of the backward-scan for the current row (e.g., the (i−1)-th row) of the intermediate image, a backward-scan intermediate row image (e.g., a second intermediate segment image) is generated. Then, the second updating process in the backward-scan is performed on the backward-scan intermediate row image. As illustrated in FIG. 4J, if the current pixel of the backward-scan intermediate row image is D', pixel D' is compared with its left neighboring pixel E' plus a distance in the second updating process, and the minimum value is used to update pixel D'. For example, the aforementioned calculation can be expressed using the following equation: D'=min(D',E'+3).

As illustrated in FIG. 4K, if the current pixel of the backward-scan intermediate row image is C', pixel C' is compared with its left neighboring pixel D' plus a distance in the second updating process, and the minimum value is used to update pixel C'. For example, the aforementioned calculation can be expressed using the following equation: C'=min(C',D'+3).

As illustrated in FIG. 4L, if the current pixel of the backward-scan intermediate row image is B', pixel B' is compared with its left neighboring pixel C' plus a distance in the second updating process, and the minimum value is used to update pixel B'. For example, the aforementioned calculation can be expressed using the following equation: B'=min(B',C'+3). After completing the second updating process in the backward-scan for the current row of backward-scan intermediate row image, the backward-scan of the current row is completed. Similarly, the second comparison process and the second updating process can be sequentially (e.g. in the order of the inverse raster scan) performed on pixels in each row of the intermediate image to generate an output image, where the value of each pixel in the output image indicates distance information of each corresponding pixel in the input image.

It should be noted that, for purposes of description, the order of the raster scan (e.g., the first order) is used in the forward scan, and the order of the inverse raster scan (e.g., the second order) is used in the backward scan in the embodiments of FIGS. 2A-2D, FIGS. 3A-3E, and FIGS. 4A-4L, but the orders of scans are not limited thereto in the present invention.

In some embodiments, the backward scan can first be performed in the order of the inverse raster scan, and then the forward scan is performed in the order of the raster scan. That is, in this embodiment, the inverse raster scan order is the first order, and the raster scan order is the second order. For example, if the inverse raster scan order is the first order, the backward-scan mask (e.g., the first mask) is used in the first scan (e.g., the backward scan) on the input image, wherein the first scan includes the first comparison process and the first updating process. However, since the backward scan is first performed on the input image, a backward-scan row image (e.g., the first intermediate segment image) is obtained after performing the first comparison process on pixels of each row in the input image. The pixels in the first intermediate segment image is updated in the first updating process. After completing the first scan of pixels in each row of the input image, an intermediate image is generated. These operations are similar to those in the backward scan in the aforementioned embodiments, and thus the details will be omitted here.

Then, the forward-scan mask (e.g., the second mask) corresponding to the backward-scan mask is used in the second scan (e.g., the forward scan) on the intermediate image in the order of the raster scan (e.g., the second order), wherein the second scan includes the second comparison process and the second updating process. However, the forward scan is performed on the intermediate image, and a forward-scan row image (e.g., the second intermediate segment image) is generated after performing the second comparison process on pixels of each row in the intermediate image. The pixels in the second intermediate segment image are updated in the second updating process. After performing the second comparison process and the second updating process on the pixels in each row of the intermediate image in the second order, an output image is generated, wherein the value of each pixel in the output image indicates distance information of each corresponding pixel in the input image. These operations are similar to those in the forward scan in the aforementioned embodiments, and thus the details will be omitted here.

FIG. 5 is a diagram of different scan masks in accordance with an embodiment of the invention. In an embodiment, in addition to the 3×3 chamfer mask, other types of scan masks can be used in the present invention, such as a city-block mask, a chessboard mask, a 5×5 chamfer mask, or a 7×7 chamfer mask, as illustrated in FIG. 5. Each mask in FIG. 5 includes a forward-scan mask and a backward-scan mask. A portion of the forward-scan mask in the rectangular frame is used in the first comparison process in the forward scan. For example, the mask pixel having a value of 0 in the forward-scan mask of the 3×3 chamfer mask is the current pixel during the first comparison process. The pixels labeled as "-" in the forward-scan mask are not processed.

It should be noted that the mask pixel having the value of 3 labeled with a circle in the forward-scan mask of the 3×3 chamfer mask is not used in the first comparison process. That is, the left neighboring pixel of the current pixel is not used in the first comparison process. Similarly, the mask pixel having a value of 0 in the backward-scan mask of the 3×3 chamfer mask is the current pixel during the second comparison process. It should be noted that the mask pixel having the value of 3 labeled with a circle in the backward-scan mask of the 3×3 chamfer mask is not used in the second comparison process. That is, the right neighboring pixel of the current pixel is not used in the second comparison process. The pixels labeled as "-" in the backward-scan mask are not processed. Other types of masks in FIG. 5 can be processed in a similar manner.

Figure 6:
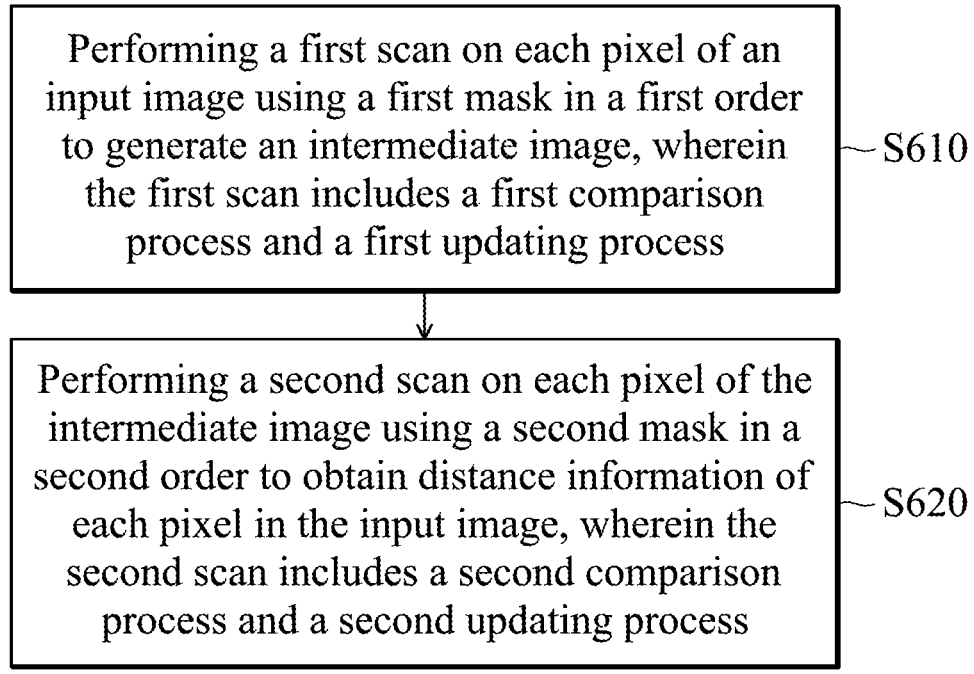
FIG. 6 is a flow chart of a method for image-distance transformation in accordance with an embodiment of the invention.

FIG. 6 is a flow chart of a method for image-distance transformation in accordance with an embodiment of the invention.

In step S610, a first scan is applied on each pixel of an input image using a first mask in a first order to generate an intermediate image, wherein the first scan includes a first comparison process and a first updating process. For example, if the first order is the raster scan order, the first mask is the forward-scan mask. Meanwhile, the first current pixel and its upper neighboring pixel, or the first current pixel and its upper, upper-left, and upper-right neighboring pixels are used in the first comparison process performed on the current row of the input image, and pixels in the input image that are prior to the first current pixel in the first order and in a first current segment on which the first current pixel is located are not compared in the first comparison process. In this example, the first current segment is the first current row in the input image on which the first current pixel is located, and the first current pixel is not compared with its left pixels on the same first current row in the first comparison process.

If the first order is the inverse raster scan order, the first mask is the backward-scan mask, and the first comparison performed on the current row of the input image may use the first current pixel and its neighboring pixel below (e.g., the backward-scan mask of the city-block mask in FIG. 5 is used), or the first current pixel and its lower, lower-left, and lower-right neighboring pixels (e.g., the backward-scan mask of the 3×3, 5×5, or 7×7 chamfer mask or the chessboard mask is used), and pixels in the input image that are prior to the first current pixel in the first order and in a first current segment on which the first current pixel is located are not compared. In this example, the first current segment is the first current row in the input image on which the first current pixel is located, and the first current pixel is not compared with its left pixels on the same first current row in the first comparison process. That is, no matter whether the first order is the raster scan order or inverse raster scan order (i.e., no matter whether the first mask is the forward-scan mask or the backward-scan mask), the first current pixel is not compared with pixels prior to the first current pixel in the first order and in the first current segment on which the first current pixel is located in the first comparison process.

Specifically, in order to eliminate the data dependency of the calculation using the pixels prior to the first current pixel in the first order and in the first current segment on which the first current pixel is located, the first current pixel and its neighboring pixels in the upper segment or lower segment (i.e., depending on the scan order and the scan mask) are used in the first comparison process in the present invention, not including the pixels the pixels prior to the first current pixel in the first order and in the first current segment on which the first current pixel is located. The first updating process is performed on the first intermediate segment image that is generated after performing pixels in each row of the input image, and then the minimum of the calculated distances in the first intermediate segment image is sequentially updated.

In step S620, a second scan is performed on each pixel of the intermediate image using a second mask in a second order to obtain distance information of each pixel in the input image, wherein the second scan includes a second comparison process and a second updating process. For example, if the first order is the raster scan order, the second order is the inverse raster scan order, and the second mask is a backward-scan mask (e.g., a second mask) corresponding to the forward-scan mask (e.g., a first mask) in the first scan. Meanwhile, the second comparison process performed on the current row of the intermediate image uses the second current pixel and its lower neighboring pixel (e.g., the backward-scan mask of the city-block mask in FIG. 5 is used) in the intermediate image, or the second current pixel and its lower, lower-left, and lower-right neighboring pixels (e.g., the backward-scan mask of the 3×3, 5×5, or 7×7 chamfer mask or the chessboard mask in FIG. 5 is used), and pixels in the intermediate image that are prior to the second current pixel in the second order and in a second current segment on which the second current pixel is located are not compared. In this example, the second current segment indicates the second current row in the intermediate image on which the second current pixel is located, and the pixels right to the second current pixel on the same second current row are not used in the second comparison process.

If the first order is the inverse raster scan order, the second order is the raster scan order, and the second mask is a forward-scan mask (e.g., a second mask) corresponding to the backward-scan mask (e.g., a first mask) in the first scan. Meanwhile, the second current pixel and its upper neighboring pixel (e.g., the backward-scan mask of the city-block mask in FIG. 5 is used) in the intermediate image, or the second current pixel and its upper, upper-left, and upper-right neighboring pixels (e.g., the backward-scan mask of the 3×3, 5×5, or 7×7 chamfer mask or the chessboard mask in FIG. 5 is used) are used in the second comparison process performed on the current row of the intermediate image, and pixels in the intermediate image that are prior to the second current pixel in the second order and in a second current segment on which the second current pixel is located are not compared in the second comparison process. In this example, the second current segment indicates the second current row in the intermediate image on which the second current pixel is located, and the pixels left to the second current pixel on the same second current row are not used in the second comparison process.

Specifically, in order to eliminate the data dependency of the calculation using the pixels prior to the second current pixel in the second order and in the second current segment on which the second current pixel is located, the second current pixel and its neighboring pixels in the upper segment or lower segment (i.e., depending on the scan order and the scan mask) are used in the second comparison process, not including the pixels the pixels prior to the second current pixel in the second order and in the second current segment on which the second current pixel is located. The second updating process is performed on the second intermediate segment image that is generated after performing pixels in each row of the intermediate image, and then the output results in the second intermediate segment image are sequentially updated. It should be noted that, after completing the second updating process, the processing unit 110 may square root the output results of each pixel in the output image to obtain distance information of each corresponding pixel in the input image. In some embodiments, the output result of each pixel in the output image generated by the second scan may be distance information of each corresponding pixel in the input image.

The flow in FIG. 6 of the present invention can be applied to the embodiments of FIGS. 3A-3E, FIGS. 4A-4L, and FIG. 5. That is, each of the forward scan and the backward scan can be divided into a comparison process and an updating process that can be used to different types of masks, thereby significantly lowering the data dependency during calculation for updating pixels and significantly increasing the efficiency of the program codes generated by the program compiler. In addition to performing the forward scan prior to the backward scan, the flow in FIG. 6 can also be applied to the operations for performing the backward scan prior to the forward scan.

Figure 7A:
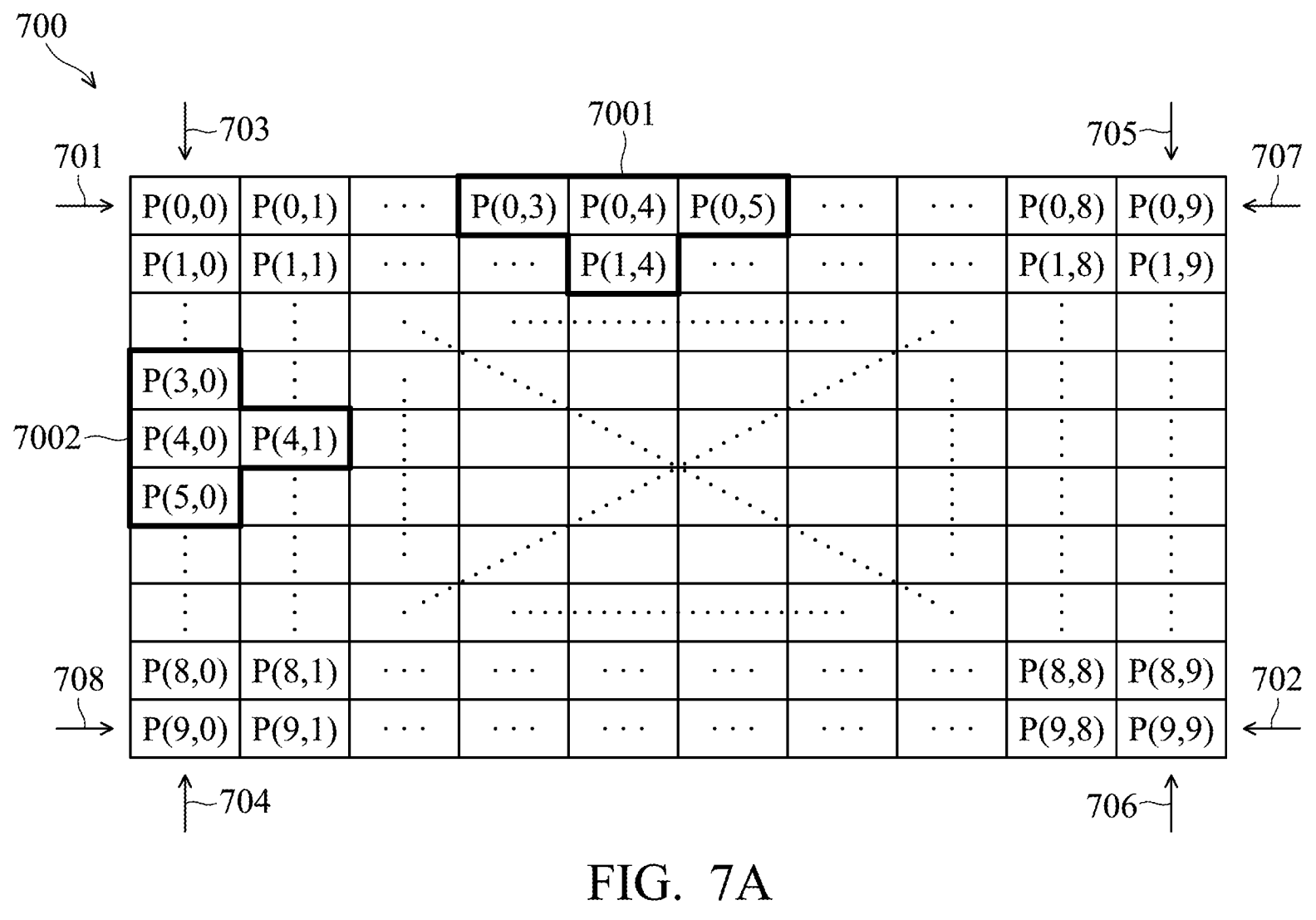
Figure 7B:
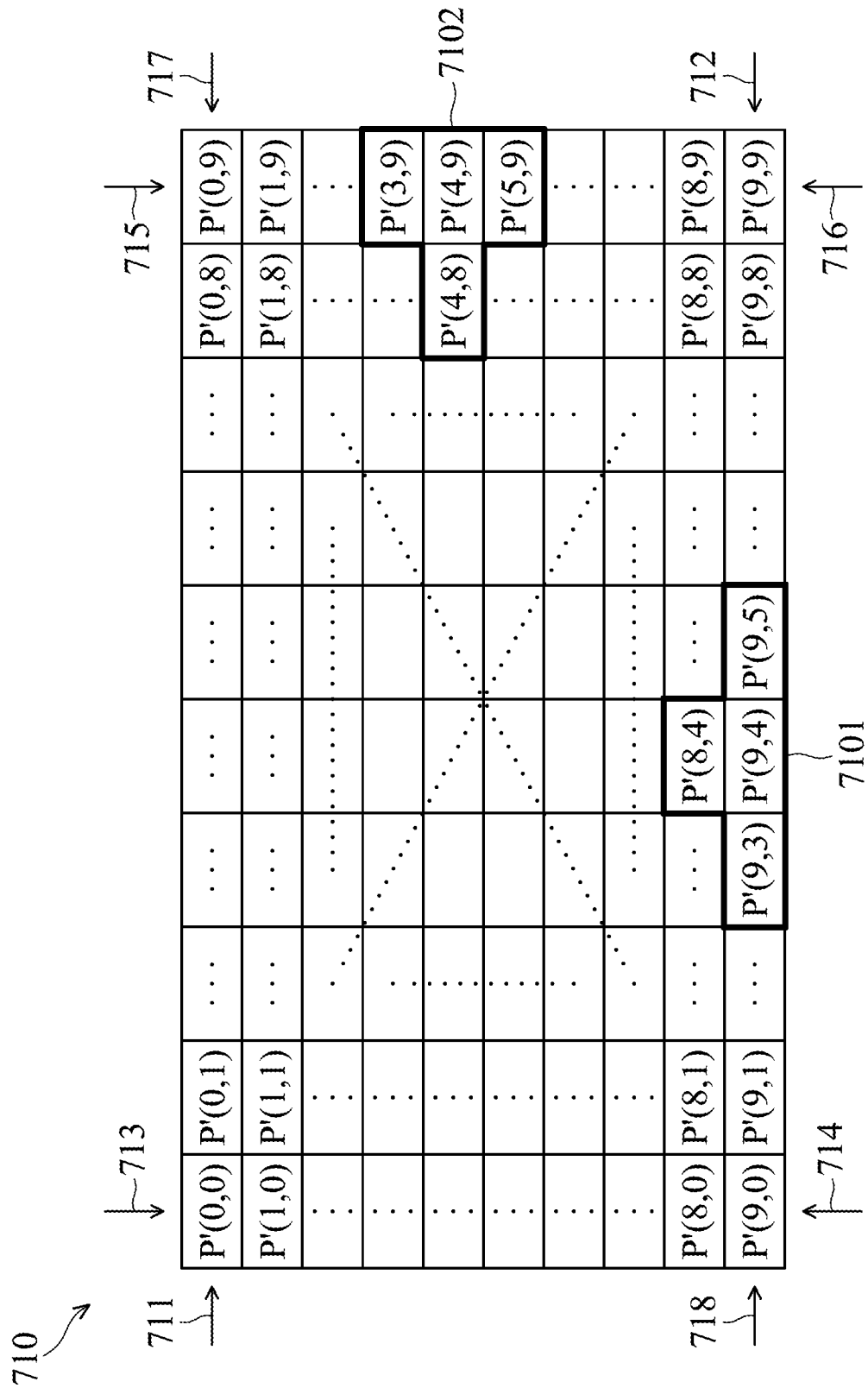

FIGS. 7A and 7B are diagrams of image distance transformation using different orders in accordance with an embodiment of the invention. In the embodiment of FIG. 6, the first order and the second order are described using the raster scan order and the inverse raster scan order as examples. However, the present invention is not limited to the raster scan order and the inverse raster scan order. For example, when the second order is contrary to the first order, the method for image distance transformation in the present invention can be applied. In an embodiment, the input image 700 includes 10×10 pixels such as pixels P(0,0)~P(9,9), as illustrated in FIG. 7A. The intermediate image 700 also includes 10×10 pixels such as pixels P'(0,0)~P'(9,9), as illustrated in FIG. 7B.

Taking the first order as an example, if the first order is the raster scan order, the first order starts from pixel P(0,0) of the input image 700, such as scanning each pixel in the input image 700 in the direction of arrow 701 from top to bottom and from left to right. Assuming that the 3×3 chamfer mask is used, when the current pixel of the first scan is pixel P(1,4), the forward-scan mask 7001, for example, includes pixels P(1,4), P(0,3), P(0,4) and P(0,5). Meanwhile, the first current segment is from pixel P(1.0) to pixel (1,9), and pixel P(1,3) is not used in the first comparison process. Conversely, the second order starts from pixel P'(9,9) of the intermediate image 710, such as scanning each pixel in the intermediate image 710 in the direction of arrow 712 from bottom to top and from right to left. When the current pixel of the second scan is pixel P'(8,4), the backward scan mask 7101, for example, includes pixels P'(8,4), P'(9,3), P'(9,4), and P'(9,5). After completing the first comparison process in the first scan on the first current segment, the first updating process may sequentially update the value of each pixel in the first intermediate segment image generated by the first comparison process, and the first scan is then performed on the next first current segment.

If the first order is the inverse raster scan order, the first order starts from pixel P(9,9) of the input image 700, such as scanning each pixel in the input image 700 in the direction of arrow 702 from bottom to top and from right to left.

In some embodiments, the first order may start from pixel P(9,0) of the input image 700, such as scanning each pixel in the input image 700 in the direction of arrow 704 from left to right and from bottom to top. For example, starting from pixel P(9,0) in the direction of arrow 704, the first current segment includes pixels from P(9,0) to P(0,0) (e.g., the first current column of the first current pixel), and the next first current segment includes pixels from P(9,1) to P(0,1). Then, the following next first current segment includes pixels from P(9,2) to P(0,2), and so on. Assuming that the 3×3 chamfer mask is used, when the current pixel in the first scan is pixel P(4,1), the forward-scan mask 7002 includes pixels P(4,1), P(3,0), P(4,0), and P(5,0). Meanwhile, the second order, for example, may start from pixel P'(0,9) of the intermediate image 710, such as scanning each pixel in the intermediate image 710 in the direction of arrow 715 from right to left and from top to bottom. For example, starting from pixel P'(0,9) in the direction of arrow 715, the second current segment includes pixels from P'(0,9) to P'(9,9) (e.g., the second current column of the second current pixel), and the next second current segment includes pixels from P'(0,8) to P'(9,8). Then, the following next second current segment includes pixels from P'(0,7) to P'(9,7), and so on. When the current pixel of the second updating process in the second scan is pixel P'(4,8), the backward-scan mask 7102, for example, includes pixels P'(4,8), P'(3,9). P'(4,9), and P'(5,9). The aforementioned first order and second order can be regarded as rotating the raster scan and the inverse raster scan 90 degrees counterclockwise, and the forward-scan mask and the backward-scan mask are also rotated 90 degrees counterclockwise.

Specifically, the first current segment of the first current pixel in the input image may be a first current row or a first current column of the first current pixel, depending on the scan order. The second current segment of the second current pixel in the intermediate image may a second current row or a second current column of the second current pixel, depending on the scan order. In addition, if the first current segment is the first current row of the first current pixel in the input image, the second current segment is the second current row of the second current pixel in the intermediate image. If the first current segment is the first current column of the first current pixel in the input image, the second current segment is the second current column of the second current pixel in the intermediate image.

In some other embodiments, the first order and the second order are not limited to the scan orders in the aforementioned embodiments. For example, flipping, interchanging, and rotation can be applied on the raster scan and the inverse raster scan individually or in combination to obtain the first order and the second order. For example, when the first order starts from pixel P(0,9) of the input image 700, such as scanning each pixel in the input image 700 in the direction of arrow 707 from top to bottom and from right to left. Meanwhile, the second order starts from pixel P'(9,0) of the intermediate image 710, such as scanning each pixel in the intermediate image 710 in the direction of arrow 718 from bottom to top and from left to right. It should be noted that each of the arrows 701-708 labeled in FIG. 7A and its direction can be used to determine the starting pixel and scanning direction of the first order, and the second order may correspond to arrows 712, 711, 716, 715, 714, 713, 718, and 717, respectively.

It should be noted that when bi-directional scans are performed using the aforementioned method, the neighboring pixel of the first current pixel in the first updating process of the first scan is selected from the pixels prior to the first current pixel in the first order and in the first current segment on which the first current pixel is located, and the neighboring pixel of the second current pixel in the second updating process of the second scan is selected from the pixels prior to the second current pixel in the second order and in the second current segment on which the second current pixel is located. That is, the neighboring pixels in the first updating process and the second updating process are dependent on the scan order. For example, the neighboring pixel is selected from the previous neighboring pixel in the corresponding order and in the corresponding current segment. In addition, the forward-scan mask and the backward-scan mask are also adjusted correspondingly based on the selected scan orders.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for image-distance transformation using bi-directional scans, comprising:
    performing, by a processor, a first scan on each pixel of an input image using a first mask in a first order to generate an intermediate image, wherein the first scan includes a first comparison process and a first updating process; and
    performing, by the processor, a second scan on each pixel of the intermediate image using a second mask in a second order to obtain distance information of each pixel in the input image, wherein the second scan includes a second comparison process and a second updating process;
    wherein a first current pixel of the input image is not compared with pixels in the input image prior to the first current pixel in the first order and in a first current segment on which the first current pixel is located in the first comparison process;

wherein a second current pixel of the intermediate image is not compared with pixels in the intermediate image prior to the second current pixel in the second order and in a second current segment on which the second current pixel is located in the second comparison process.

2. The method as claimed in claim 1, wherein the first order is a raster scan order and the second order is an inverse raster scan order, wherein the first mask is a forward-scan mask, and the second mask is a backward-scan mask corresponding to the forward-scan mask.

3. The method as claimed in claim 2, wherein the first current pixel and its upper neighboring pixel, or the first current pixel and its upper, upper-left, and upper-right neighboring pixels are examined in the first comparison process, and the second current pixel and its lower neighboring pixel, or the second current pixel and its lower, lower-left, and lower-right neighboring pixels are examined in the second comparison process.

4. The method as claimed in claim 1, wherein distance information of pixels in a first intermediate segment image generated in the first comparison process performed on the first current segment of the input image is sequentially updated in the first updating process, and distance information of pixels in a second intermediate segment image generated in the second comparison process performed on the second current segment of the intermediate image is sequentially updated in the second updating process.

5. The method as claimed in claim 1, wherein:
if the first current segment of the first current pixel is a row in the input image, the second current segment of the second current pixel is a row in the intermediate image; and
if the first current segment of the first current pixel is a column in the input image, the second current segment of the second current pixel is a column in the intermediate image.

6. An apparatus for image-distance transformation, comprising:
a memory unit, configured to store an image-distance-transformation program; and
a processor, configured to read the image-distance-transformation program from the memory unit for execution to perform the following steps:
performing a first scan on each pixel of an input image using a first mask in a first order to generate an intermediate image, wherein the first scan includes a first comparison process and a first updating process; and
performing a second scan on each pixel of the intermediate image using a second mask in a second order to obtain distance information of each pixel in the input image, wherein the second scan includes a second comparison process and a second updating process;

wherein a first current pixel of the input image is not compared with pixels in the input image prior to the first current pixel in the first order and in a first current segment on which the first current pixel is located in the first comparison process;

wherein a second current pixel of the intermediate image is not compared with pixels in the intermediate image prior to the second current pixel in the second order and in a second current segment on which the second current pixel is located in the second comparison process.

7. The apparatus as claimed in claim 6, wherein the first order is a raster scan order and the second order is an inverse raster scan order, wherein the first mask is a forward-scan mask, and the second mask is a backward-scan mask corresponding to the forward-scan mask.

8. The apparatus as claimed in claim 7, wherein the first current pixel and its upper neighboring pixel, or the first current pixel and its upper, upper-left, and upper-right neighboring pixels are examined in the first comparison process, and the second current pixel and its lower neighboring pixel, or the second current pixel and its lower, lower-left, and lower-right neighboring pixels are examined in the second comparison process.

9. The apparatus as claimed in claim 6, wherein distance information of pixels in a first intermediate segment image generated in the first comparison process performed on the first current segment of the input image is sequentially updated in the first updating process, and distance information of pixels in a second intermediate segment image generated by the second comparison process performed on the second current segment of the intermediate image is sequentially updated in the second updating process.

10. The apparatus as claimed in claim 6, wherein:
if the first current segment of the first current pixel is a row in the input image, the second current segment of the second current pixel is a row in the intermediate image; and
if the first current segment of the first current pixel is a column in the input image, the second current segment of the second current pixel is a column in the intermediate image.

* * * * *